United States Patent [19]

Cianfrocca et al.

[11] Patent Number: 6,088,796
[45] Date of Patent: Jul. 11, 2000

[54] SECURE MIDDLEWARE AND SERVER CONTROL SYSTEM FOR QUERYING THROUGH A NETWORK FIREWALL

[76] Inventors: Francis Cianfrocca, 41-02 48th Ave., Long Island City, N.Y. 11104; Adam H. Sohn, 10 Old Oak Rd., Rye Brook, N.Y. 10573

[21] Appl. No.: 09/129,800

[22] Filed: Aug. 6, 1998

Related U.S. Application Data

[60] Provisional application No. 60/054,876, Aug. 6, 1997.

[51] Int. Cl.⁷ .................................................. G06F 17/30
[52] U.S. Cl. .................... 713/152; 713/153; 713/154; 713/200; 713/201; 707/9; 707/10; 709/225; 709/300; 709/302
[58] Field of Search .................... 707/9–10; 709/225, 709/300, 302; 713/200, 201, 152, 153, 154

[56] References Cited

U.S. PATENT DOCUMENTS

| | | | |
|---|---|---|---|
| 5,550,984 | 8/1996 | Gelb | 709/245 |
| 5,623,601 | 4/1997 | Vu | 713/201 |
| 5,699,513 | 12/1997 | Feigen et al. | 713/201 |
| 5,768,503 | 6/1998 | Olkin | 713/201 |
| 5,784,463 | 7/1998 | Chen et al. | 380/21 |
| 5,790,809 | 8/1998 | Holmes | 709/228 |
| 5,826,029 | 10/1998 | Gore, Jr. et al. | 709/203 |
| 5,828,833 | 10/1998 | Belville et al. | 713/201 |
| 5,828,893 | 10/1998 | Wied et al. | 709/229 |
| 5,835,726 | 10/1998 | Shwed et al. | 709/229 |
| 5,898,830 | 4/1999 | Wesinger, Jr. et al. | 709/225 |
| 5,903,732 | 4/1999 | Reed et al. | 709/229 |
| 5,915,087 | 6/1999 | Hammond et al. | 713/201 |
| 5,983,350 | 11/1999 | Minear et al. | 709/225 |

*Primary Examiner*—Thomas G. Black
*Assistant Examiner*—William Trinh
*Attorney, Agent, or Firm*—Aufrichtig Stein & Aufrichtig, P.C.; Peter D. Aufrichtig

[57] ABSTRACT

A secure access query system incorporating a messenger system. The system includes a communication server for receiving queries from a user and transmitting replies to the user, an application server for providing replies to queries, a network firewall for preventing unauthorized access to the application server and a messenger system, coupled to the communication server for receiving queries from the communication server, transmitting the query across the network firewall along a secure pathway established by the application server between the messenger system means and the application server, receiving replies from the application server along the secure pathway and transmitting the replies to the communication server. Queries from the user, outside of the network firewall, are thus communicated in a secure fashion to the application server, within the firewall, and replies are provided to the user from the application server through the secure pathway with the messenger system and the communication server.

30 Claims, 6 Drawing Sheets

SECURE MIDDLEWARE AND SERVER CONTROL SYSTEM FOR QUERYING THROUGH A NETWORK FIREWALL

This Application claims the benefit of U.S. Provisional Application Ser. No. 60/054,876 filed Aug. 6, 1997.

BACKGROUND OF THE INVENTION

The invention is generally directed to a middleware control system and server control system utilized in connection with Internet, intranet, extranet and related access control approaches and structures and, in particular, to a middleware control system which supports multiple protocols including standard protocols such as HTTP and SMTP, as well as providing improved functionality and improved protection against unauthorized access through a network firewall.

Current HTTP servers, as described in RFC 2068, and proprietary server APIs have a limitation that the HTTP server cannot maintain a warm-socket connection to other running processes on the same or different computers. In addition, HTTP servers cannot provide asynchronous inter-process communications between programs running on disparate operating systems or between web browsers (including HTML and Java applets) and running programs which may or may not reside on the same computer as the HTTP server. As the use of distributed information in connection with the Internet, corporate intranets and increasingly complex network cooperative arrangements including extranets develop, there is a growing need for improved functionality at increased speeds with less operating system overhead and increased network security.

In addition, in the past, applications (including, but not limited to web browsers, HTTP servers and server programs), that had direct or indirect access to a database behind a firewall required the firewall to be configured to allow for some incoming socket connections through the firewall. By allowing for any incoming connection, the database or any other resource behind the firewall was subject to attack by hackers and other unauthorized users.

In addition, HTTP servers with APIs that supported load balancing across multiple computers required configuration changes for any change in the number of computers used to load balance. As the volume of activity in corporate networks, intranets and the Internet continues to increase, capacity changes must be made on a more frequent basis. The need to constantly reconfigure the servers to achieve load balancing is progressively more complex, problematical, and undesirable.

Accordingly, there is a need for an improved middleware control system which increases the functionality of current HTTP servers such that the HTTP server can maintain a warm-socket connection to other running processes on the same or differing computers, as well as providing asynchronous inter-process communications between programs running on disparate operating systems and between web browsers and running programs which may or may not reside on the same computer as the HTTP server.

There is also a need for applications requiring direct or indirect access to a database behind a firewall having access to the database but in a fashion controlled inside the firewall so that access to sensitive materials is controlled.

There is also a need for an improved control system for allowing HTTP server APIs that support load balancing across multiple computers to be dynamically scaled up without the need for configuration changes.

Accordingly, there is a need for an improved middleware control system which provides highly accelerated access to data base information and application software behind a network firewall and which may be scaled without the need for reprogramming so that the complexity and diversity sources of the application software data base elements is transparent to the user for whom the system looks like a dedicated direct access to an application.

SUMMARY OF THE INVENTION

The invention is generally directed to an asynchronous message-oriented middleware product that enables inter-process communications. The processes can be written in any programming language and run under any operating system across any number of computers. The asynchronous message-oriented middleware product in accordance with the invention supports multiple protocol (which are also called formats) including standard protocols such as HTTP and SMTP and is, in fact, also an HTTP server. When applications connect to the middleware product they hold a full-duplex, warm socket connection to the asynchronous message-oriented middleware product. Because the middleware product supports warm socket connections it allows for real time data feeds to web browsers using either HTML or Java using the same port as the original HTTP connection.

The invention is also directed to an application server which is connected to the asynchronous message-oriented middleware product which allows for a heightened level of security by preventing any inward bound connections through the network firewall only authorizing outward bound connections from the application server inside the network firewall through the firewall to the middleware product.

The invention is also directed to an asynchronous message-oriented middleware product which handles load balancing configuration dynamically so that additional application servers can be connected to the system for load balancing purposes without requiring any configuration changes to the middleware or the associated application programs.

Accordingly, it is an object of the invention to provide an improved asynchronous message-oriented middleware product that enables inter-process communications which support various protocols, including additional native protocols designed for the middleware itself.

A further object of the invention is to provide an improved asynchronous message-oriented middleware product that also operates as an HTTP server and provides full-duplex warm socket connections for connections with applications running on other computers.

Yet another object of the invention is to provide an improved asynchronous message-oriented middleware product that enables inter-process communication which allows for real-time data feeds to web browsers using HTML or Java and using the same port as the original HTTP connection.

Still yet a further object of the invention is to provide an improved asynchronous message-oriented middleware product that allows for heightened security of database connections by placing the database behind a firewall that prohibits any incoming traffic and access through the firewall is only allowed for an outgoing initiated connection from a middleware enabled application (within the firewall) to the middleware product (on the outside of the firewall), thereby restricting access to the middleware enabled application only through the pathway connecting the middleware product to the middleware enabled application across the firewall established from within the firewall.

Yet another object of the invention is to provide an improved security system for application server programs in which no configuration information about database, database connections or database application logic resides on or is even available on the HTTP server and connections with the applications behind the firewall are allowed only by middleware enabled application initiated connections through the middleware product.

Yet a further object of the invention is to provide an improved middleware product which provides security against unauthorized access to application software and internal databases by utilizing a dynamic middleware configuration which establishes a pathway through the firewall with the middleware enabled application server on a specified port initiated by the middleware enabled application server.

Still yet a further object of the invention is to provide a middleware product which handles load balancing configuration dynamically so that additional servers can be connected to the middleware system for load balancing purposes without requiring any configuration changes to the middleware system or the associated application programs.

Yet another object of the invention is to provide a middleware product which handles load balancing of application servers in a dynamic configuration which optimizes throughput of the system to the user by use of either a round robin or top of the queue when free queuing system.

Yet still another object of the invention is to provide a middleware product which handles dynamic load balancing by maintaining a queue of applications running on application servers and their current status.

Still other objects and advantages of the invention will, in part, be obvious and will, in part, be apparent from the specification.

The invention accordingly comprises the features of construction, combinations of elements and arrangements of parts which will be exemplified in the construction as hereinafter set forth, and the scope of the invention will be indicated in the claims.

BRIEF DESCRIPTION OF THE DRAWINGS

For a fuller understanding of the invention, reference is had to the following descriptions taken in connection with the accompanying drawings, in which.

DETAILED DESCRIPTION OF THE PREFERRED EMBODIMENT

Figure 1:
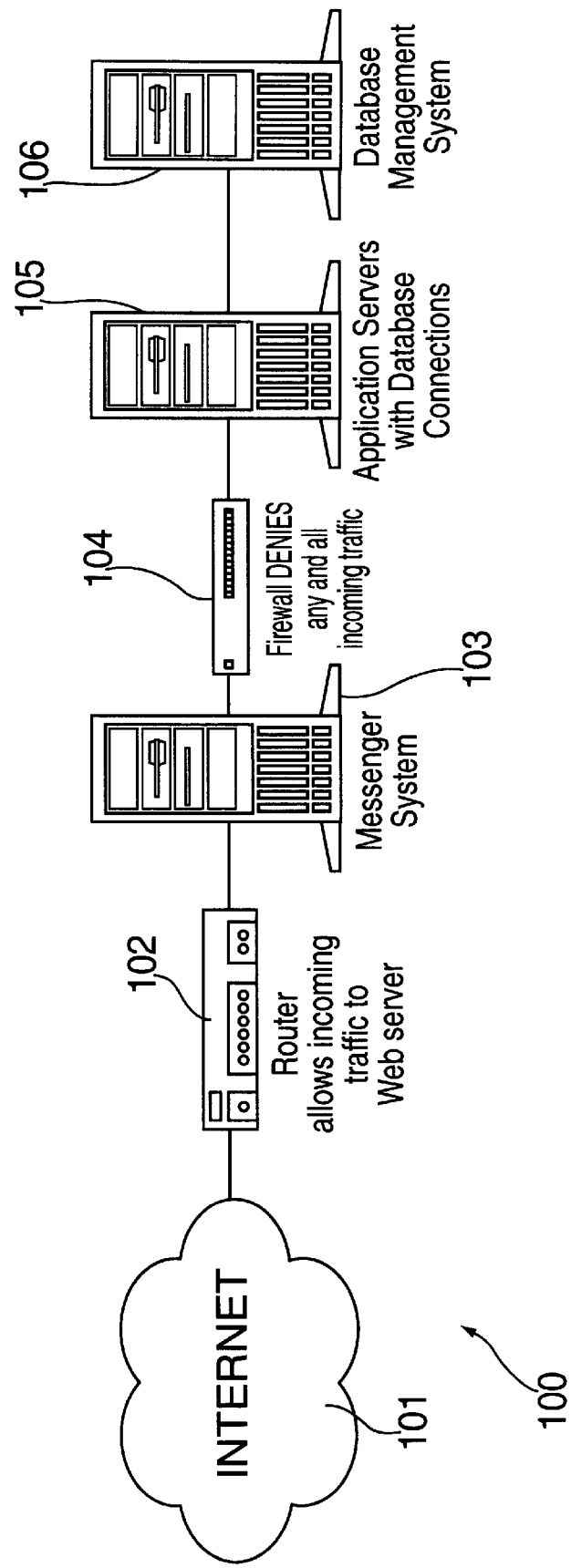
FIG. 1 is a block diagram of a connection system constructed in accordance with a preferred embodiment of the invention.

The asynchronous message-oriented middleware product, known as the messenger system is a multi-protocol server that supports HTTP, HTTPS, SMTP, and a native messenger system protocol. In a current preferred embodiment the native protocol is called native Tempest Messenger protocol. The messenger system has built in support for an arbitrary number of additional protocols as well. Like most TCP/IP based server products, the messenger system accepts socket connections from other programs on other computers. In addition to the messenger system's multi-rotocol features, it can identify the protocol used for a connection and treat it appropriately.

Different types of programs connect to the messenger system in different ways. A web browser connects to the messenger system using HTTP in the same way it would connect to an ordinary HTTP server. In the case of HTTP 1.0, the messenger system knows to close the socket connection once information is sent back to the web browser. In addition to a web server, the messenger system can interface with a mail server, directory server, security server and proxy server.

A messenger system enabled application uses a supporting library ("User Agent") to connect to the messenger system using the native messenger system protocol. The User Agent is available on a variety of platforms including Windows 3.1, Windows 95, Windows NT, Unix and Java. It can be made available for other platforms as well. The messenger system enabled application uses a Connect function in the User Agent to establish a connection to the messenger system on a specified port. A messenger system enabled application does not have to reside on the same computer as the messenger system. The messenger system enabled application simply has to be on the same TCP/IP network (local or wide area network including, but not limited to, the Internet), as the messenger system. When the Connect function is used, the messenger system knows that the native protocol is being used and the messenger system will hold the socket connection open until the messenger system enabled program uses the Disconnect function in the User Agent module. Since the native messenger system protocol is a full-duplex protocol, any desired amount of information can travel in either direction between the messenger system enabled application and the messenger system while the connection is open. While the connection is open, the messenger system enabled application can also call other functions available in the User Agent module. Even if no data is being sent in either direction the connection is kept open.

The messenger system enabled application does not listen on any TCP/IP ports and, therefore, never receives a socket connection from the messenger system or any other messenger system enabled application. Therefore, if a messenger enabled application is behind a firewall and it connects to the messenger system in front of the firewall and a database behind the firewall, the firewall can be configured to block any and all incoming socket connection. The web application, available to users with web browsers via the messenger system, has access to the database data and features made available by the messenger enabled application.

The functions in the user agent module resemble E-mail commands including "Send", "Reply", "Set Reply Address", "Broadcast", "Relay", "Create Mailbox", "Open Mailbox", "Close Mailbox" and "Retrieve Message". Other functions can likewise be added as necessary or appropriate.

When a web browser sends an HTTP request to the messenger system, the messenger system analyzes the URL (Universal Resource Locator), and if the URL corresponds to a "mailbox" name that is being created by a messenger system enabled application (using the Create Mailbox function in the User Agent module), then the messenger system passes the contents of the HTML query string (including the contents of any HTML forms), to a messenger system enabled application that has executed the Open Mailbox function in the User Agent for the "mailbox" name that appeared in the URL. Where there are multiple copies of the messenger system enabled application, there may be multiple choices for the query string's destination based on the availability of the various copies of the messenger system enabled applications (which may be in one or more physical servers).

The contents of the HTML query string are "pushed" in real time to the User Agent module of the messenger system enabled application. The messenger system enabled application is then notified by either receiving an event or the return of a call to the Retrieve message function in the User Agent module. The User Agent module is a software library, associated with the messenger system enabled application, which communicates preferably in a native messenger protocol (but optionally in HTTP, SMTP or other indicated protocol) with the messenger system and in turn then communicates with the application running on the server in the format understood by the application server. The User Agent can be visualized as a small box at the corner of a larger box which represents the application, together forming a messenger system enabled application. In this way, all communications by the application are through the User Agent module which in turn establishes a warm socket connection to the messenger system, dedicated to that messenger system enabled application. The messenger system can at the same time have a series of identical messenger system enabled applications connected to it on a series of ports. Each connection is initiated by the application itself and terminated by the application. No control over the connection arrangement exists in the messenger system which is outside the network firewall.

The messenger system enabled application can then send HTML code back to the web browser by passing the new HTML string to the Reply function in the User Agent module. The messenger system automatically returns the HTML string to the web browser with the messenger system enabled application knowing nothing about the web browser. The messenger system enabled application does not "know anything about" the web browser because it has no direct contact. In fact, the messenger system and User Agent act as a conveyor system for providing controlled access from an external user through the firewall to the application server and then returning the response to the query back to the user.

The messenger system enabled application that receives the message from a web browser may not reply immediately to the web browser. Alternatively, the messenger system enabled application calling the Relay function in the User Agent module may send either the original message or a modified message to another messenger system enabled application via a second "mailbox" name. A messenger system enabled application that has called the Open Mailbox function in the User Agent module for the second mailbox will then receive the relayed message. The message can be relayed as many times as desired until a messenger system enabled application finally calls the Reply function in the User Agent module to send information back to the web browser. This would be a series of related programs and databases networked together and invisible to the user who communicates only with a web browser.

It should be noted that a Java capable browser can act as a messenger system enabled application because the messenger system User Agent for Java contains the same functions as other messenger system User Agents.

Reference is next made to FIG. 1, wherein a block diagram, generally indicated as 100, constructed in accordance with a preferred embodiment of the invention is depicted. System 100 includes Internet hardware and software external to the user's system. A router 102 allows incoming traffic to reach a web server. A messenger system 103 is connected between router 102 and a firewall 104. The messenger system 103 is connected to applications servers 105 having database connections on the other side of the firewall. The database management system 106 is connected to the application servers and may only be accessed through the application servers 105 which are on the inside of the firewall 104. The messenger system 103 acts as an intermediate point between the request for information and access to the application servers and database management system as the inside of the firewall. In accordance with a preferred embodiment of the invention, the firewall is configured to prohibit any and all incoming socket connections.

Requests for information or data or use of applications on the application server 105, coming through messenger system 103 are thus limited to those authorized by the messenger system enabled application. Firewall 104 can be configured to deny access to the application server 105 by any and all incoming traffic regardless of source. Messenger system enabled application server 105 is enabled to make a connection (establish a full duplex socket connection) outward through the firewall 104 to the messenger system 103 along a designated port. The genuineness of the connection between the messenger system enabled application which resides on the application server can be assured of security by the heightened security related to the restricted pathway and further by an application server based security verification system inside the firewall.

Prior security systems having password protected security either had the security controls outside of the firewall or, if on the inside of the firewall, allowed free access to the database and application server to confirm the security codes. Here, the access is restricted to only the authorized connection from the messenger system enabled application which will only recognize supported and authorized messenger system enabled application functions and queries from a known source (the messenger system 103). In this way, potentially dangerous access to the server is blocked and no outside agent can obtain direct access to the application server.

A messenger system enabled application connects to the messenger system using the Connect function. During the Connect function operation, the User Agent of the messenger system enabled application opens a socket connection to the messenger system which is listening on one or more designated ports. This connection is a full-duplex connection and is held open until the User Agent of the messenger system enabled application calls the "disconnect" function. Since all messenger system messages are delivered via the messenger system, the User Agent of the messenger system enabled application does not listen on any TCP/IP ports and, therefore, never receives a socket connection from the messenger system or any other messenger system enabled application. Therefore, if a messenger system enabled application is behind a firewall and it connects to the messenger system in front of the firewall and to a database behind the firewall, the firewall can be configured to block any and all incoming socket connections while the web application available to web browsers via the messenger system has access to the database and features made available by the messenger system enabled application.

The critical functional difference in operation is the manner in which the firewall 104 denies any incoming traffic from outside of the firewall. The only access through the firewall is through designated ports opened as a result of an outgoing Connect request from the messenger system enabled application inside the firewall. Inquiries coming through one of the designated ports may be compared, for security purposes, inside the firewall by the messenger system enabled application inside the firewall. No execution of requests or queries is enabled unless and until the internal security check has been completed. For certain applications no security of this sort is required. In another preferred embodiment, security features can be added to the messenger system as well. These security features can include designation of a specific port which will be the only access port the application server will accept a connection with, and more conventional security measures.

An outside user, whether from the Internet or otherwise, has no ability to circumvent the outer messenger system and gain access through the firewall, which is not through the messenger system. The messenger system enabled application is established in a fashion to seek out authorized messenger system components on the designated ports having the required security identifications prior to allowing access to the application server and database management system from outside the firewall. This approach also provides a higher level of security than was previously available in connection with efforts to make unauthorized changes to either the application server or unauthorized access to the database management system by virtue of the requirement that any access be along the designated and generally dedicated pathway or port through the firewall, which connection must be initiated by the messenger system enabled application inside the firewall.

This structure is particularly adapted to large application systems in which data needed for appropriate response to user inquiry is located in remote sites. The remote sites may either be different data bases, different computers at a single site or, as it is becoming more common, remote servers at geographically remote sites.

In a current preferred embodiment of the invention a bank loan web site application is supported utilizing the messenger system and related architecture. The basic problems that exist with the web access to a student loan data base include the location of relevant information related to a particular student's account on various data base servers distributed throughout the bank's physical structure (which may be in geographically remote sites), separate as to computer applications for responding to different types of queries located on different servers and with varying capacity limitations and a critical need to maintain the confidentiality and protection of proprietary data bases from inappropriate access and tampering. To resolve this situation, as well as to increase substantially the access times of the user to the required information, a messenger system based architecture is utilized.

Figure 2:
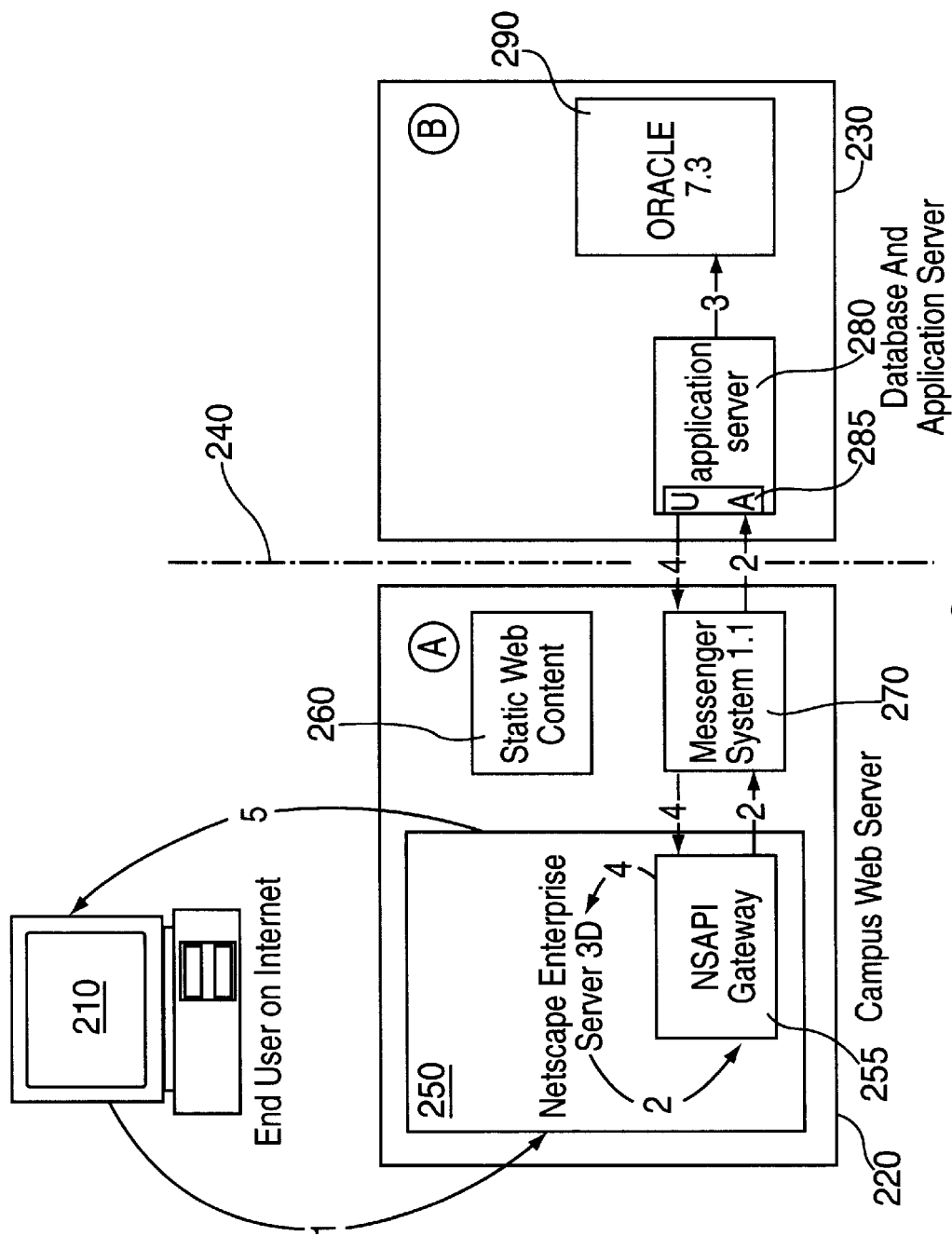
FIG. 2 is a block diagram of a system architecture in accordance with a preferred embodiment of the invention.

Reference is next made to FIG. 2 wherein a messenger system based architecture 200 is depicted. The system 200 incorporates an end user on the Internet 210 shown connecting to the server 250, which in a preferred embodiment is Netscape Enterprise Server 3.0. Other servers may be utilized as well. Server 250, static web content data base 260 and messenger system 270 are shown in box 220 as being user accessible outside of the firewall and as a part of a web server. The Enterprise server 250 includes a messenger system NSAPI gateway 255 which functions as a User Agent between the web server and messenger system 270. On the other side of firewall 240 is a data base application server generally indicated as 230 and including an application server 280 and a data base 290. Application server 280 includes a User Agent 285 which establishes contact across firewall 240 with messenger system 270. The numbered arrows identified in FIG. 2 represent types of information which are transmitted between the various elements. Numbered arrow 1 represents requests for dynamic content set by a user, generally in HTTP. Arrow 2 identifies requests for dynamic content generally initiated by user requests interpreted by web server 250 and passed through messenger gateway 255 to messenger system 270 which routes the query to a User Agent 285 in an appropriate applications server 280 to request the appropriate dynamic contents. While the drawing of FIG. 2 includes only a single data base and application server 230, in fact there may be a series of different application servers, each of which has its own User Agent module associated with it, a single server running multiple copies of an application, each application running on a server having its own User Agent module, or some combination thereof. The connections between the messenger system 270 and User Agent 285 of an application server 280 is always initiated, maintained and controlled from application server 280 and not from the public side of firewall 240. Arrow 3 is a request for Oracle database information which is sent by application server 280 to the Oracle data base 290 in a native Oracle data base interface protocol. Other types of data base structures can also be utilized without change in the invention. Arrow 4 represents the transmission of dynamic content back from application server 280, which has received the dynamic content from data base 290 through User Agent 285 which in turn passes the information to messenger system 270 and on to gateway 255 where web server 250 retransmits the response to end user 210.

It is important to note that the prior systems incorporating data bases behind firewalls with HTTP based queries have suffered from substantial and significant overhead concerns which have seriously deteriorated the speed and responsiveness of these systems. Generally, prior art systems which communicated across a firewall require that each access across the firewall for information requires an authentication process to determine the bona fide of a user, the source and the request. The nature of a HTTP request is that there is request for connection which is made to respond to a single query. As that query is authenticated and authorized a call is made to the application server and data base for the dynamic content which is then returned to the user and the socket is closed. Particularly in applications where a single query by a user is actually a series of calls to the application server, each of which must be dealt with by a variety of data base and application servers at remote sites each query in the daisy chain requires initiation of a socket connection authentication processing and then closing down the socket, prior to restarting the process for each additional query. AS a result, access to data bases behind a firewall tend to be extremely slow and incur large system overhead costs in operation. In contrast, the nature of the middleware control and server control system constructed in accordance with the preferred embodiment of the invention establishes a warm socket between the application, inside the firewall, and the messenger system, outside the firewall, which is initiated only once by the application server. The firewall is configured to allow no access to the application servers from outside the firewall, regardless of the source of the query. Instead, an application server connects to a specified port on the messenger system and, once the connection is established across the firewall there is a full duplexed communication available along that warm socket. It is called a warm socket to indicate that it is maintained in an open state even if there is not data traffic in either direction. This warm socket avoids the need for establishing a connection and then closing down the connection as each query is formulated and responded to. Rather, the signal is sent along the established pathway between the application server inside the firewall and the messenger system port on the outside of the firewall. In practice, the query is treated like a package by the gateway within the application server messenger system and application server User Agent which merely transmit an appropriate query on a secure pathway to the application server. The only types of queries which will be passed through are those which meet a restricted class of requests established in accordance with the functionality of the application server and security concerns. The absence of the overhead of setting up and closing down multiple connections between the web server and application servers and data bases makes access to data, even if at a number of remote locations, almost instantaneous. In the current preferred embodiment, in which application servers and data base servers are located at a number of different locations across the United States, requests for information which require access to information in a number of those data bases to prepare an appropriate response, are provided in less than one tenth of one second. For all intents and purposes this is essentially instantaneous. This level of responses and performance is simply unavailable in prior art configurations in which separate connections and sockets through the firewall must be established and then terminated for each query.

The messenger system will pass the contents of an HTML query string, including the contents of HTML forms, to a messenger system enabled application that has executed an Open Mailbox function in the User Agent module for the Mailbox name that appeared in the URL. Alternatively, a messenger system enabled application can send a message to a messenger system mailbox using the Send or Relay functions in the User Agent module. The messenger system will pass the contents of that message sent to a messenger system enabled application that has executed the Open Mailbox function in the User Agent module for the Mailbox name that appeared in the Send or Reply functions.

If multiple messenger system enabled applications have called the Open Mailbox function for that mailbox, the messenger system will only deliver the message to one of the messenger system enabled applications using a variety of load balancing mechanisms that can be controlled via User Agent functions.

When a new messenger system enabled application then calls Open Mailbox, the messenger system will automatically include the new messenger system enabled application in the load balancing process by adding identifiers for the new messenger system enabled application to a list of processes that have the specified mailbox opened. Open Mail Box for a specified Mail Box indicates an application server running a specified application is both in contact with the messenger system through one socket connection and is available to receive a new query. In simple terms, an Open Mail Box call indicates that an application server is unoccupied and ready to handle a new query. In addition, once a messenger system enabled application calls the Close Mailbox function, the messenger system will remove any identifiers for the existing messenger system enabled application from the list of processes that have the Mail Box opened. This list of processes to have the mail boxes opened is the equivalent of a resource list which identifies where the next query should go. In most large systems multiple copies of the same application software or multiple servers running the same application software are utilized to provide sufficient capacity to deal with the volume of the inquiries and load on the system so that responsiveness is at desired levels. By reserving the ability to add or subtract server resources from the system the throughput of the system can be modified and system resources allocated as necessary. For example, if the system is subject to high usage demands during certain hours additional servers or copies of the application software running on a single server may be added to the system resources to provide greater capacity to inquiries. No special program is required to accomplish this result. Instead, the messenger system adds each warm socket connection to an application server designating a specified Mail Box (corresponding to a particular type of application being run) on a roster or subscription list. As an application server closes its connection with the messenger system the roster is automatically updated.

While traditional load balancing approaches have utilized various algorithms and queuing approaches, the general approach has been to create queues at the application server. This approach can be utilized but tends to be inefficient, particularly where the amount of time required to process a query can vary from a relatively brief period to a much longer period. In many cases, an application system includes queries which require essentially no system resources and immediate response and others requiring substantial calculation and data base access requirements. In many cases the lengthy query response times can exceed the brief response times by a factor of 50 or 100. This has the effect of increasing the potential for uneven access times depending upon the nature of the requests in an application server's request queue. In addition, the messenger system always knows the locations of any and all messenger system enabled applications that have been connected to it because that information has been provided when the warm socket connection is initiated by the User Agent of a messenger system enabled application when the Connect function is called. Therefore, no configuration changes to the messenger system are required because configuration for load balancing is performed automatically and dynamically.

The default mechanism is a round robin system in which queries are distributed based on the order in which they are received by the messenger system. A messenger system enabled application server can make itself appear "busy" to the messenger system by automatically closing the mailbox immediately after one message is delivered to it. The User Agent is also able to supply additional heuristics to the messenger system for controlling load balancing.

With the round robin system the messenger system allocates queries to a particular application system in order of receipt. For example, if there are three applications servers running a particular application software, the first, fourth, seventh, tenth and every third request thereafter would go to the first application server. The second application server would receive requests two, five, eight, eleven, fourteen, etc. Likewise, the third application server would receive requests three, six, nine, twelve, fifteen, etc. While this system appears to appropriately allocate queries and will accomplish this function in the event that the processing time for responding to queries is generally the same or relatively close in time, problems may exist in the event that there are wide discrepancies in the amount of time to process a query. If the discrepancy between two types of queries varies by a factor of 10, 50 or 100 times from any other type of query, a user query to an application server which fortuitously receives a number of the long processing queries in front of it would have a much longer response time than for a similar query at a different application server. In fact, with this round robin system it is possible that one or more of the application servers may be idle and without a query while a new request is sent to an application serve which is bogged down with a series of lengthy queries.

An alternate preferred embodiment of messenger system maintains a queue of the subscription list. As an application server sends an Open Mailbox command to the messenger system, indicating that it is free, the messenger system places that application server at the top of the queue. In this way, the messenger system utilizes a modified queue system in which queuing is performed in a single location at the messenger system rather than at each of the application servers. This is much like the traditional bank systems with multiple tellers and multiple customers. The round robin systems corresponds to a scenario in which customers are directed in order to a series of different lines regardless of the relative lengths of each line. In contrast, the modified system allocates generally in a round robin system with modifications based upon actual availability. In other words, if a teller finishes with a customer, that teller goes to the top of the queue so that the next available customer goes to that teller.

Where the processing time for all allowed queries of an application server (also referred to as a messenger enabled application) are approximately the same, the round robin system works satisfactorily. However, where there are discrepancies in length of response time to different queries the queuing system which places application servers which send an Open Mailbox transmission go to the top of the queue is substantially more efficient. Generally, the messenger system establishes a subscription list which includes all application servers of a particular type which have sent an open mailbox message. When the alternate load balancing system is utilized and a query is sent to the application server the messenger system then takes that application server off the subscription list. When an application server is ready to receive another query it issues an open mailbox request which places that server at the top of the subscription list. When all of the application servers are occupied, the system assures that no request is delayed any more than any other request. If we use an example in which one type of request takes ten times as long to process as a second type of request, but only occurs about one tenth as frequently as the second type of request, the following scenario could occur. In a strict round robin approach where three servers are present, the first server could receive the first type of request (longer request) while the second and third servers could receive the shorter, second type of request. If the fourth request went to the first server, than the second and third servers may be idle, waiting for a new request, while the fourth request is queued up waiting for the first server to complete its earlier request. In contrast, with the modified dynamic loading approach, the first three requests would be treated the same as with the round robin system. However, when the fourth request came in, if the second server had completed its first request, then it would have sent an Open Mailbox to the messenger system and been placed at the top of the subscription list so that the fourth request would be directed to the second application server and processed prior to the completion of the first server's completing of the processing of the first request. In scenarios where there are a substantial number of requests and a substantial number of application servers running the same application, the overall system efficiency can be highly improved by this approach. The messenger system is useful in its server role by its ability to execute instructions and calls to the server in a wider variety of formats and protocols than the basic HTML and HTTP servers. By virtue of its ability to directly process additional protocols, the messenger system can accept socket connections from many other programs on other computers regardless of the operating system or computer platform involved. The messenger system can identify the protocol used for a connection and treat it appropriately without the need to call other application software to handle this function.

On the web server side of the architecture, the messenger system can communicate with a wide variety of different servers running various systems by use of an appropriate gateway. In the example noted above where the web server is a Netscape Enterprise server, a Netscape API gateway is utilized. Where a Microsoft web server is utilized an ISAPI is utilized as the gateway to the messenger system. A single messenger system unit may connect with a variety of different web servers, intranet servers and extranet servers, among others, each of which has a gateway to the messenger system which translates the routing information for the query into either the messenger system native protocol or an open protocol, such as HTTP, SMTP or LDAP. Connections between the gateway messenger system and User Agent for an application server are conducted in either the native messenger system protocol or the designated protocol. Because of the way that all internal transfers of query packets are dealt with in a unified protocol, the messenger system can communicate on either the web server side of the firewall or the internal side of the firewall with a virtually unlimited number of different operating systems or programming languages in a transparent fashion. It is only necessary that the gateway on the web server side of the firewall and the User Agent modules on the internal portion of the firewall side be configured to communicate between the operating system or application language and the messenger system protocol. In fact, different application servers can be running the same program in different versions running either on different operating systems or different programming languages and communicate transparently with the messenger system and user queries through the messenger system architecture.

The application is also applicable to use in connection with a specialized application server which is designed to execute CGI (Common Gateway Interface) programs. When a user accesses a server with a URL which includes a request to run a particular CGI program, the application server then executes the requested GCI program code. As each query for a CGI program is received by the application server, the application server either (depending on the operating system) forks and executes the requested CGI program or spawns the requested CGI program. Due to the forking/spawning, a single application server is not inherently limited as to the number of CGI requests it can handle simultaneously. As a result, it is not necessary to have multiple copies of the application server running on a single physical server. Also, load balancing is not necessary with only a single server. Because of the need to run the requested CGI program it has not been possible to place the application server which runs the CGI program behind a firewall. However, in accordance with the messenger system architecture constructed in accordance with the invention, the CGI executing application server, the CGI programs (which may include source code), all database connections and the database can be placed behind a network firewall and multiple application servers can be utilized with a load balancing configuration. In a preferred embodiment the messenger system itself, or a web server attached to the messenger system receives queries, e.g. from the Internet, an intranet or extranet, and then passes them through the network firewall along a secure pathway established by a specialized CGI messenger enabled application on the inside of the firewall. The messenger system transmits to the user agent for the CGI messenger enabled application the URL which contains a request to run a specific CGI program and any other relevant information received by either the web server or messenger server from the user transmitting the query. The application server is configured to respond to only a limited number or type of queries. In the event that the query is not one which the application server is authorized to respond to, either because of a mistake by the user, effort to access an unauthorized function or intentional malicious effort, the application server notes an inability to respond to the query and replies that it is unable to respond. No direct access to the application server is obtained by the user. Essentially, the application server is only programmed to respond to queries which meet a table of authorized parameters. Anything outside of this authorized table is not processed so that the integrity and security of the application server is maintained. With current systems where the application server must be on the outside of the firewall a malicious user has the ability to interact directly with the application server and attempt to tamper with or view its configuration and/or program code. The absence of this direct access provides heightened security. In addition, through the use of the messenger system it is possible to utilize multiple application servers configured for CGI code on the inside of the firewall to allow load balancing and increased throughput. The messenger system can be configured to receive connections from a number of different messenger system enabled CGI application servers, each of which establishes a connection with the messenger system at a specified port on the messenger system from inside the firewall. No connections are ever made through the firewall from outside the firewall. The multiple messenger system enabled CGI application servers are added to a messenger system subscription list as they establish a connection with the messenger system. Thereafter, the messenger system, using the round robin allocation system can direct queries to each of the messenger system enabled CGI application servers in order to load balance. In this way, if the load for CGI applications increases additional CGI application servers can be added into the system by establishing a connection with the messenger system.

In this way queries which include requests to run a particular CGI program, which has previously required the application server to reside on the outside of the firewall and be limited to the capacity of a single application server can now be moved to a higher security position within the firewall and with the ability to add multiple application servers with dynamic load balancing.

Applications can comfortably be developed using the messenger system with a minimal amount of hardware. It is feasible and common for developers to run all the required components of messenger system on their own workstations. However, when deploying messenger system applications in a production setting, system administrators and managers may choose from a variety of possible arrangements. The choices are made in light of particular goals relating to system performance, security and manageability. Messenger system itself imposes relatively few constraints on available choices for deploying applications on particular computers or sets of computers. This flexibility enables a range of deployment choices to meet goals for security, performance and manageability.

The first task in deploying a messenger system application is to decide which computer or computers will run each of the various components of the application. You must install a messenger daemon or system service on one particular computer, and then install the various components of the application on either the same computer, another computer, or several other computers. In-general, the "components" of the distributed application are software modules. These software modules are capable of communicating and interacting with each other through the messenger system User Agent library. The messenger system makes no distinction between "clients" and "servers." The messenger system views all components as peers. However, it is typical to design applications consisting of client and server components. In some cases, you may only need to build servers if you use standard Web browsers (such as Netscape's Navigator and Communicator products and Microsoft's Internet Explorer) to serve as clients for distributed applications. A distributed application comprises a single messenger system process and all the individual application programs (running on different machines at different times) that are linked together by means of the single messenger system. A messenger system process may anchor any number of different applications simultaneously, but the application components that communicate and interact must all be connected to the same messenger system.

Configuring the messenger system primarily involves deciding which TCP ports it will listen to, and which machines it will accept connections from. Configuring the User Agent primarily involves making sure it knows the network location and TCP port of the messenger system process, and the mailboxes that it will open and/or send messages to.

Multiple component processes may open the same mailbox in the same messenger system. In this case the messenger system will automatically perform load-balancing across the components. There is no additional programming required for load-balancing and automated fail-over.

Figure 3:
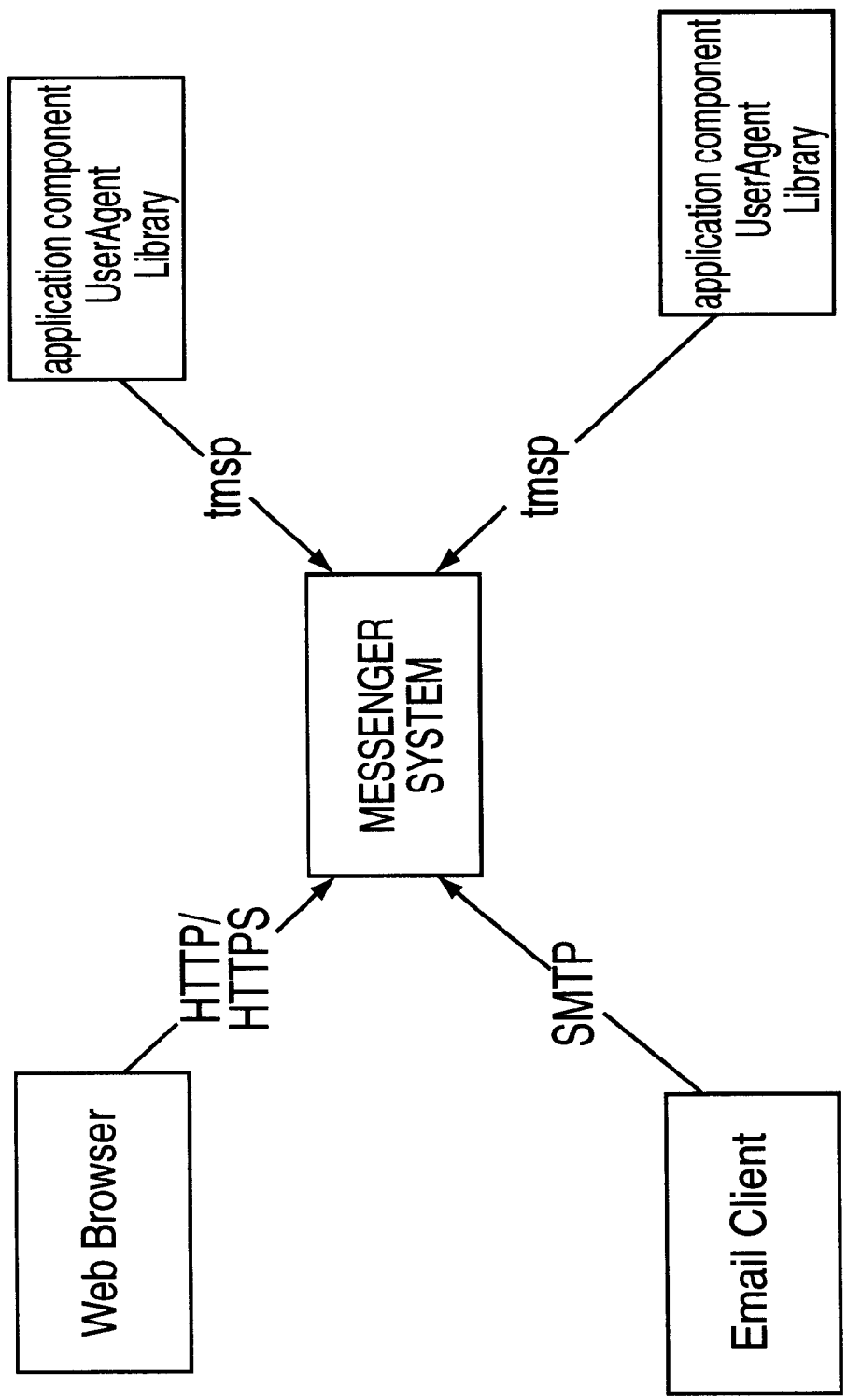
FIG. 3 is a block diagram of a system architecture in accordance with another preferred embodiment of the invention.

Communications in the messenger system take place exclusively over TCP/IP connections. The IP suite of protocols, including TCP/IP, is the "native language" of the global Internet, and of a growing number of organizational WANs and intranets. Application components in messenger system never communicate directly with each other. They exchange information exclusively through TCP connections that each component shares with the messenger system process. Depending on the configuration, the messenger system is capable of accepting TCP connections from several different kinds of program. Application components written with the User Agent library connect to the messenger system via messenger system System Protocol (TMSP), a full-duplex protocol derived from HTTP. Web browsers connect to the messenger system using HTTP or HTTPS, the standard protocols of the World Wide Web. Internet or corporate e-mail clients and transfer agents connect to the messenger system using SMTP, the standard protocol for Internet mail. Notice that these various connection types differ only in the message-exchange protocol they use. All are normal TCP connections originating from the application to the messenger system. FIG. 3 illustrates how communications originate from various processes to the messenger system. You can configure the messenger system to accept connections on several different TCP ports simultaneously. Each listener specifies a particular TCP port on which the messenger system will accept incoming connections. For each listener, you can specify protocol and access characteristics that are distinct from those of any other listeners in that messenger system. Among the characteristics that can be controlled for each listener are: the protocols the messenger system will accept (TMSP, HTTP, and/or HTTPS); whether or not data-encryption will be employed on the connection; lists of IP addresses (including wildcards) from which the listener will accept or deny connections from; and whether the connection will accept config/admin operations. In general, to maximize security only the minimum amount of capability needed on a particular connection should be enabled.

For example, a single application server that dynamically generates HTML pages with information from a database can connect to the messenger system via the User Agent on a port that allows the TMSP protocol. If there are security concerns, the messenger system will specify that it can only accept TMSP connections on that port from the IP address of the particular computer which will run the application server. A set of IP addresses, or a wildcard range may be specified if application servers will be run on more than one computer. You can also specify a wildcard range of allowed IP addresses, with some subset of the range specifically excluded. Web browsers will also need to access the messenger system so they can view the HTML pages generated by the application server. To do so, HTTP connections on some particular port are allowed. This will typically be port 80, the IANA-standard port for HTTP connections, but it can be any value selected, provided no other process is already listening on that port. The IP addresses from which browser connections will be allowed must also be selected. If the application is designed for an organizational intranet, then a range of allowed addresses corresponding to users who are authorized to access the application must be specified. If the application will be accessed over the Internet, then a much wider range of allowed addresses, possibly every address, may be required.

In this example, it is possible to specify a single TCP port to accept both the HTTP connections from the browsers and the TMSP connections from the application server. However, it is more secure to run the two kinds of connection on different ports. This configuration allows you to specify different access-controls for them, as appropriate. In particular, it is important to allow TMSP (User Agent) connections for application servers only from machines directly under your control. Another important benefit from using multiple ports is that you can greatly increase system security when using the messenger system in conjunction with firewalls and/or packet filters.

It is often useful for messenger system enabled application programs to send Internet e-mail. The User Agent library supports this capability. However, messenger system enabled application programs do not connect directly to mail servers in order to send e-mails. In many production environments, this situation would create considerable configuration difficulties and possible security violations. Instead, Internet e-mail messages sent from applications are routed to the messenger system, which in turn forwards them to an SMTP server. In effect, the messenger system is acting as an SMTP client on behalf of the sending application program. The SMTP server built into the messenger system cannot be used directly because, as noted above, it has no capability to forward mail or resolve DNS MX records. This apparent lack of functionality in the messenger system is actually an intentional security feature.

In order to allow the messenger system to send Internet e-mails on behalf of messenger system enabled applications, you must specify the IP address, or host-domain name, of one or more Internet mail servers in the messenger system's configuration file. The messenger system will forward Internet mail messages received from messenger system enabled applications to one of these servers.

Special configuration requirements apply if you are encrypting communications over one or more listeners. Transport-layer security, also known as SSL, requires the correct installation of files containing public and private encryption keys, and also may require that you obtain proper authorization from a "certification authority" such as Verisign.

Configuring messenger system enabled application components is a straightforward process reflecting a fundamental property of messenger system architectures—a process can exchange data with many other processes without needing to know the location of the other processes. A component only needs to locate a messenger system in order to communicate with the other components connected to that messenger system.

Messenger system enabled application components are programs that call routines in the User Agent library and connect to one or more messenger systems via TCP/IP. In terms of the semantics of an application, components may be "clients" that run at user workstations with a GUI interface; they may be "servers" that connect to databases or otherwise provide centralized access to computational resources; or they may be peers. In order for the User Agent to connect to the messenger system, it must know the IP address or host-domain name of the computer where the messenger system is running, and it must know the TCP port on which the messenger system is listening for TMSP (User Agent) connections.

The messenger system allows application architects to design "application servers" which provide selective access to such resources as databases and transaction-based systems. For example, you may want to allow a large number of individuals to access a corporate database, but only for the purpose of executing a small and particular set of queries, but no updates. Traditional client/server approaches would require you to write an application that opened a connection to the database itself. This approach suffers from obvious security, performance and scalability problems, even if access is restricted only to users within your organization. If your goal is to provide access to Internet-based users, then the security and performance problems become overwhelming. At the very least, it is inadvisable to allow users to connect directly to your database over the open Internet.

A better way is to write an application server that can accept query-requests from client programs or Web browsers. The application server will open a direct connection to the database, but none of the client programs or browsers will. Additionally, you can write the application server so that it includes no code for executing any database operations other than the ones you specifically wish to enable. This approach improves the security of the deployed application by precluding direct connections to your database from computers not directly under your control. Unauthorized individuals have no ability to corrupt your database or perform unauthorized queries or transactions. System scalability, performance, and robustness are also enhanced because the number of database connections is minimized, and the connections never run over a WAN or over the Internet. These benefits are applicable even in systems that run entirely inside an organizational network, inaccessible from the Internet.

We will now discuss two possible deployments for messenger system based distributed applications that service the Internet (or some other WAN) or an intranet or extranet from an installation which contains sensitive data protected by a firewall. Both methods are highly secure; one of them utilizes a common DMZ ("demilitarized zone") approach, and the other combines a DMZ with an innovative use of firewalls made possible by the messenger architecture.

Figure 4:
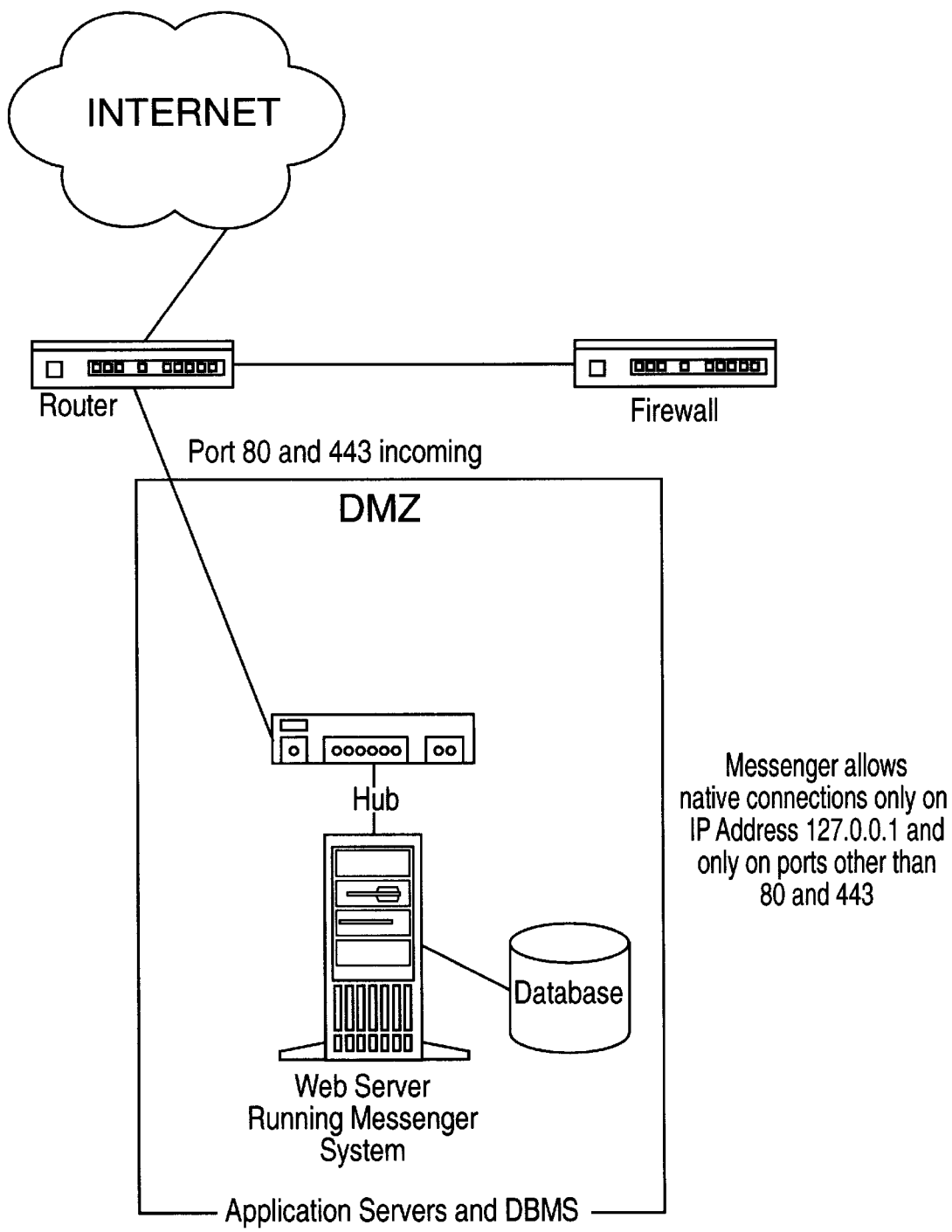
FIG. 4 is a block diagram of a system architecture in accordance with another preferred embodiment of the invention.

FIG. 4, shows a schematic of the former kind of deployment. This drawing assumes an Internet-based user community accessing a corporate application with Web browsers, but the picture can easily be generalized to intranet deployments using custom-written client applications. All that is necessary for the clients is a network route to the Web server. The messenger system and all application servers run on the same computer as the Web server. In fact, the messenger system may itself be the Web server.

This architecture assumes a "demilitarized zone" (DMZ) that is partially protected from the Internet or corporate WAN by way of a packet-filtering router. All other sensitive systems, not shown in this diagram, are located behind a firewall. The DMZ protects the computers that run the components—including the messenger system and associated application servers—anchoring the distributed application while completely protecting other resources. The resources behind the firewall are not accessible from either the DMZ or the Internet or WAN. The recommended way to set up this deployment pattern is to configure the messenger system to accept TMSP (User Agent) connections only on address 127.0.0.1 (localhost) and some high-numbered TCP port that is not otherwise in use, for example 11600. The application servers must be configured to connect to the messenger system on this port. Web browsers accessing the system from outside the DMZ will connect via HTTP/HTTPS on the normal TCP ports for these protocols (80 and 443, respectively), so the messenger system must be configured to allow these connections, and to disallow TMSP connections on ports 80 and 443.

At this point, the packet-filtering router, that serves as the bastion of the DMZ to disallow all incoming connections on ports other than 80 and 443, is configured. This configuration allows no user, authorized or unauthorized, to access the messenger system on any port but 80 and 443. In this case, the messenger system accepts only connections on these specified ports, thereby eliminating any possibility that an unauthorized person could install a malicious application server to connect to the messenger system from outside the DMZ and disrupt the distributed application.

FIG. 4 shows the messenger system and the application servers running on the same computer. This configuration may be feasible in small-scale systems. For more robust deployments, it is preferred to run the database engine on its own computer that may also be situated inside the DMZ and outside your firewall. Many database engines accept connections from database client-programs on particular TCP ports that may or may not be configurable.

You can increase the load-carrying capacity of the system by deploying the application servers on one or more additional computers all installed within the DMZ and connected to the messenger system computer via a LAN (Local Area Network) connection. In any case, the messenger system is preferably configured not only to accept TMSP connections on a particular TCP port, but also only to accept connections from the IP addresses of the particular set of computers that will be running application servers.

It is often impractical or undesirable to install a database outside of a firewall, even if it is shielded inside a DMZ behind a packet-filtering router. In many organizations, databases represent some of the most sensitive and valuable corporate resources and they should be protected by the strongest means available. However, the value of allowing Web-based users to access databases is often so great that organizations try to circumvent this issue by replicating databases onto computers residing in DMZs. messenger system provides good support for this approach.

An alternative in use is to install the databases inside the firewall, but to allow the application servers, running in the DMZ, to open connections through the firewall to the databases. This approach should be avoided because it requires the reconfiguration of firewalls to allow inbound TCP connections on the particular port that the database engine uses. The purpose of a corporate firewall is to protect the assets on the inside while allowing users situated inside the firewall to selectively access resources residing outside the firewall. Therefore, security is always compromised whenever a firewall is configured to allow an inbound connection.

Figure 5:
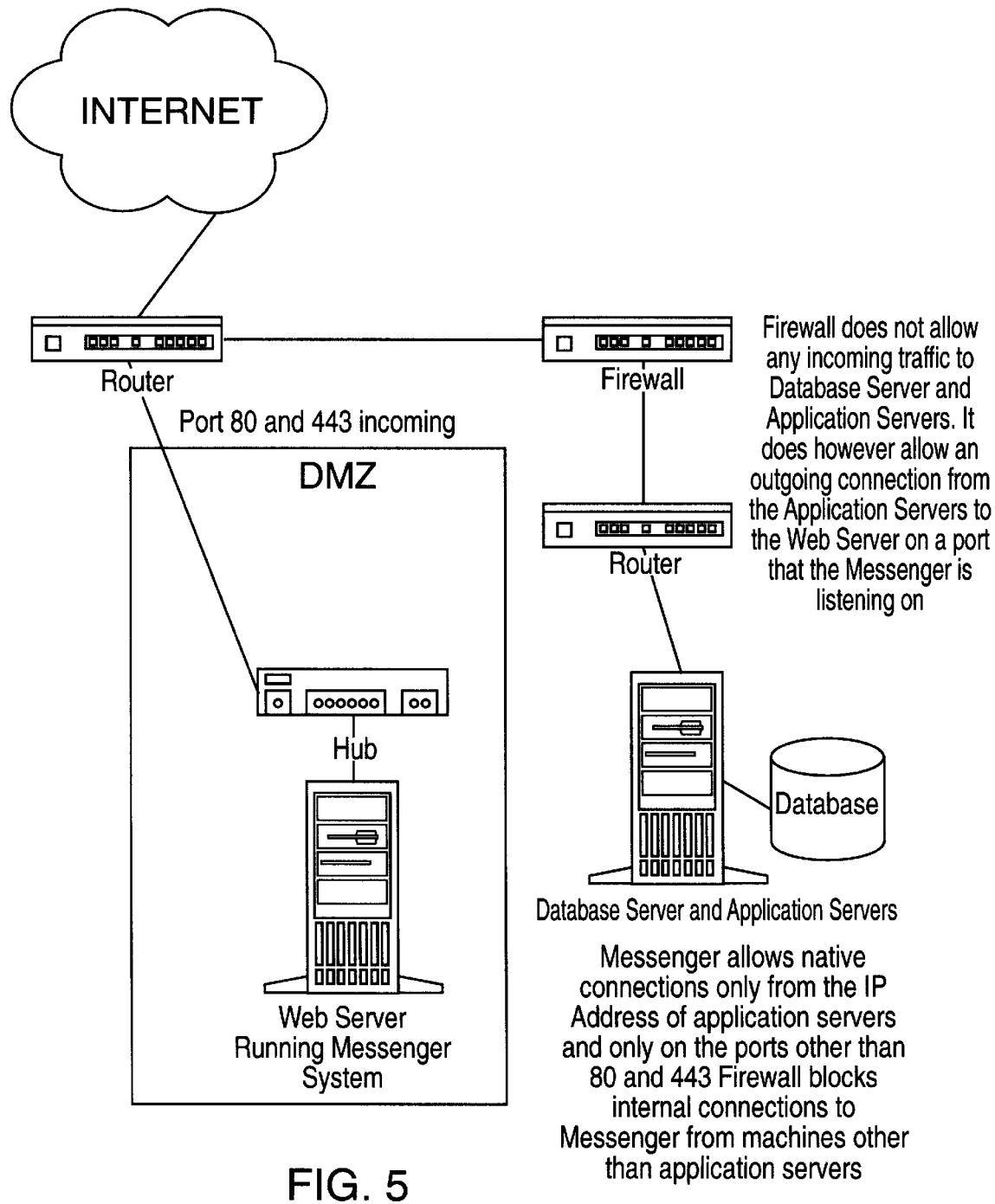
FIG. 5 is a block diagram of a system architecture in accordance with another preferred embodiment of the invention.

Reference is next made to FIG. 5 wherein an architecture in which the messenger system runs on a computer located in the DMZ, is shown. The application servers, database engine, and other transaction servers are all situated behind the firewall. Application servers are sensitive by virtue of the fact that they typically have direct connections to databases and other critical resources. Remember that messenger system enabled application components can receive requests from clients only after making a TCP connection to the messenger system, and that the TCP connections originate from the components, and are accepted by the messenger system. All the application components that hold direct connections to critical resources are placed behind a firewall. To connect to the messenger system, they make TCP connections outbound through the firewall—there is no need to allow any connections inbound through the firewall at all, because there are no processes inside the firewall that must accept TCP connections.

This architectural pattern implies several important things about the configuration of the firewall. It must be configured to allow outbound TCP connections on a selected TCP port. This is the port on which the messenger system will listen for TMSP (User Agent) connections from the application servers situated inside your firewall. Many firewalls, especially those deployed in high-security environments, may be configured to allow TCP connections on a particular TCP port only from certain hosts to certain hosts. If possible, the firewall should be configured to allow connections on the chosen port for the application only from the computer or computers running the messenger system enabled application components to the computer running the messenger system.

The messenger system should also be configured to only accept TMSP connections from these same computers. The firewall need not allow any TCP connections originating from outside the firewall, and it need not allow UDP connections in either direction. The fact that direct network connections to any computer behind your firewall are prevented from computers outside the firewall constitutes a very significant enhancement of overall security for the distributed application. This essentially eliminates the possibility of "hacker" attacks that depend on making a network connection to network computers and exploiting weaknesses in the network protocols used on the connections.

Figure 6:
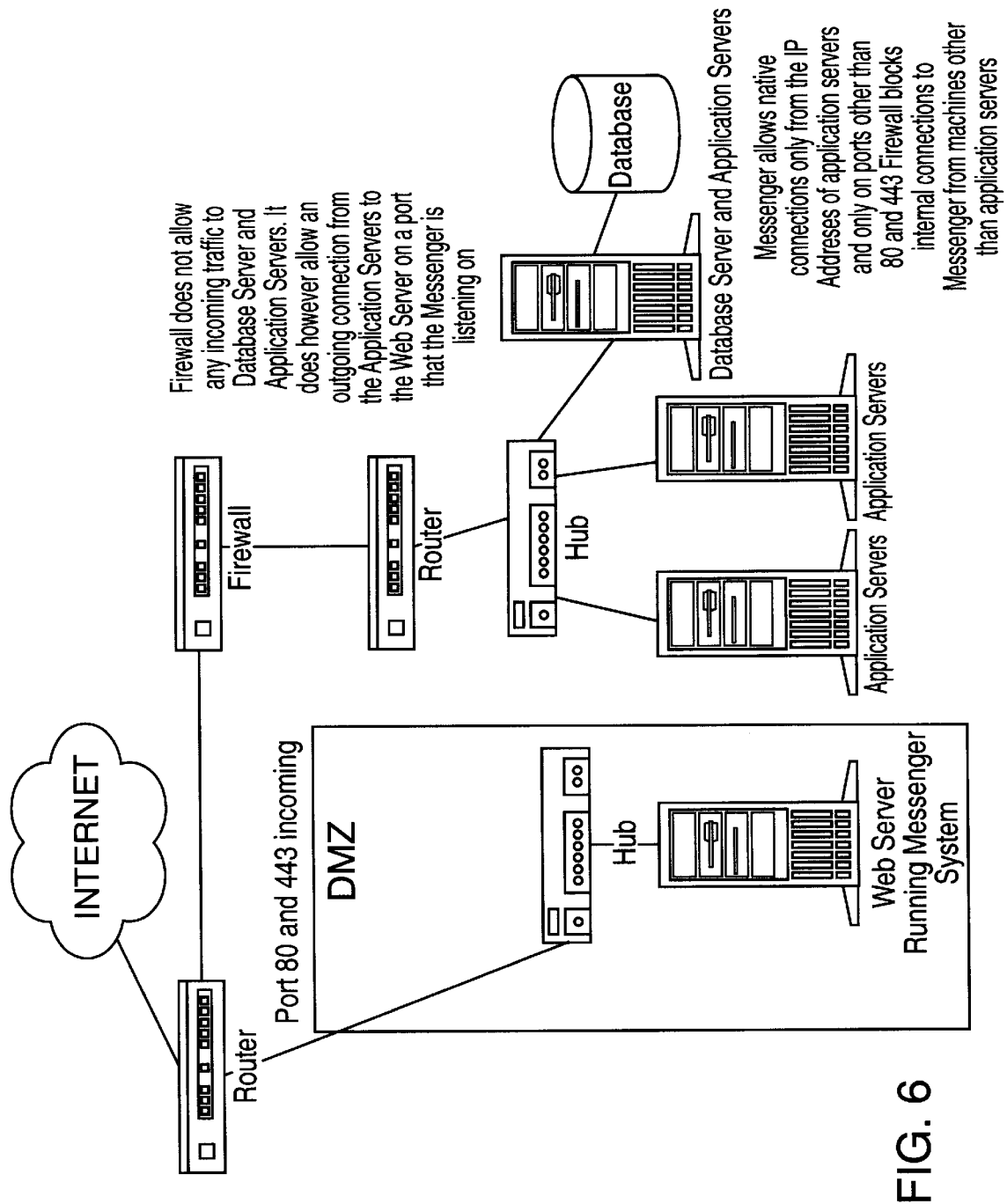
FIG. 6 is a block diagram of a system architecture in accordance with another preferred embodiment of the invention.

FIG. 6 shares the inherently strong security characteristics of the structure of FIG. 4 and adds the element (already discussed above) of running multiple copies of application components on several different computers. Because of the messenger system's automatic load-balancing capabilities, this architecture can lead to measurably better performance.

There is an often performance-enhancing side-effect associated with the recommended architecture in which application servers are located inside the firewall and connect outward to a messenger system residing in a DMZ. Because application servers connect to the messenger system using the TMSP protocol, the connections are long-lived, essentially lasting for the duration of the application process. It is often practical for this connection lifetime to be unlimited, barring hardware failures, etc. This configuration can substantially reduce the load on the firewall, a dedicated piece of hardware that acts in effect as a single-point channel through which users of the distributed application communicate with the application servers. Contrast this architecture with conventional approaches that rely on CGI scripts or other kinds of programs that open database connections through the firewall. In addition to the significantly increased security risks, the conventional approach also requires many more TCP connections through the firewall, instead of relying on connections that are already established. With the recommended approach, a higher proportion of the data traffic through the firewall can be "payload" rather than connection-establishment overhead.

The messenger system is a full-featured HTTP server, and can serve static HTML files in the standard manner by accessing the files from the local hard disk of the computer on which the messenger system runs. The messenger's ability to integrate the functions of a standard Web server with access to application server components running on other computers is a unique feature.

The Tempest Messenger can act as a server for standard CGI (Common Gateway Interface) scripts by way of the tmscgi (Tempest Messenger System CGI) feature. Tmscgi is a messenger system application component linked against the User Agent library. Its particular purpose is to execute CGI scripts. The tmscgi feature exists in the messenger system to allow you to run legacy CGI scripts in conjunction with messenger system enabled applications. The creation of new CGI applications for use with TMS is not generally recommended, because it is considerably simpler and easier to write Tempest application components instead. However, there is a substantial installed base of CGI applications which can be supported with the messenger system structure. Performance and scalability are almost always significantly better with messenger system application components as well.

If there are CGI scripts that you wish to run with the messenger system, the messenger system's architecture allows for an elegant security and performance enhancement that is not available with conventional Web servers. You do not need to run the CGI scripts on the same computer that runs the messenger system. Tmscgi is a messenger system application that connects to the messenger system using TMSP, and it invokes the CGI scripts directly. The HTML responses from the CGI scripts are not sent directly back to the requesting browser, but are routed through the messenger system, which itself replies to the browser.

All of the security and performance-enhanced architectures described above are available for deploying tmscgi. It can be replicated on multiple machines and can be deployed on machines behind your firewall to a messenger system located in your DMZ. This configuration eliminates several serious problems associated with the usage of CGI. First, this architecture relocates the process-fork overhead of CGI scripts from the Web server to another machine or machines, substantially lessening the load on the Web server. Second, this architecture removes the need to allow processes running on your Web server, which may or must be partially exposed to external users, to access sensitive assets such as databases and transaction servers.

The messenger system is an excellent HTTP server for Web-enabled distributed applications. However, another Web server can be used. The messenger system can seamlessly act in conjunction with conventional Web servers, providing access to messenger system application components. The messenger system is configured as a "gateway" application using a gateway module particular to the chosen Web server. The messenger system includes two "gateways" to conventional Web servers—an NSAPI filter for interfacing with the Netscape Enterprise Server and an ISAPI extension for Microsoft's Internet Information Server (IIS). The NSAPI/ISAPI gateways provide a mechanism for examining HTTP requests received by conventional Web servers and selectively passing some of the requests to a messenger system for servicing as messenger system enabled requests. The replies, generated by messenger system enabled application components, are routed automatically back through the messenger system, then through the Web server gateway program, back to the conventional Web server and ultimately to the Web browser that generated the original request. In order to accomplish the connectivity to the messenger system, the gateway programs are normal messenger system enabled application components. They are programs linked with the User Agent library, and they make normal TCP connections to the messenger system.

One preferred configuration for using the messenger system in conjunction with a conventional Web server is to run the messenger system, the Web server, and the NSAPI or ISAPI gateway program on the same machine. Messenger system enabled application components that connect to the messenger system will typically run on different machines in accordance with the security models described above.

The messenger system is preferably implemented in connection with a firewall based security configuration with at least one messenger system enabled application server which is located within the firewall. The messenger system itself is located outside of the firewall. Generally, the communication across the firewall is controlled by the messenger system enabled application which must reach outward across the firewall to the messenger system component sitting outside of the firewall to establish a socket. Because the messenger system enabled application will only communicate along the established socket, outside agents cannot enter through the firewall.

Accordingly, an improved multi-protocol server that supports multiple protocols, increases security by restricting access across the firewall to outward bound connections and provides dynamic load balancing without the need for reconfiguration or reprogramming is provided.

Accordingly, it will thus be seen that the objects set forth above, among those made apparent from the preceding description are efficiently attained and, since certain changes may be made in the above constructions without departing from the spirit and scope of the invention, it is intended that all of the matter contained in the above description or shown in the accompanying drawings, shall be interpreted as illustrative, and not as limiting.

It is also to be understood that the following claims are intended to cover all of the generic and specific features of the invention, herein described and all statements of the scope of the invention which, as a matter of language, might be said to fall therebetween.

What is claimed is:

1. A secure access query system, comprising:
   a communication server for receiving queries from a user and transmitting replies to the user;
   an application server for establishing a secure connection and providing replies to queries;
   a network firewall for preventing unauthorized access to the application server;
   a messenger system means, coupled to the communication server for receiving queries from the communication server, transmitting the query across the network firewall along a secure pathway established by the application server between the messenger system means and the application server, receiving replies to queries from the application server along the secure pathway and transmitting the replies to the communication server;
   whereby queries from the user, outside of the network firewall, are communicated in a secure fashion to the application server, within the firewall, and replies are provided to the user from the application server through the secure pathway with the messenger system means and the communication server.

2. The secure access query system of claim 1 wherein the communication server is an Internet web server.

3. The secure access query system of claim 2 wherein the Internet web access server is accessible by users through the Internet.

4. The secure access query system of claim 1 wherein the communication server includes a gateway module for translating the query received from the user to a messenger system means protocol.

5. The secure access query system of claim 4 wherein the messenger system means protocol is a native protocol to the messenger system means.

6. The secure access query system of claim 1 wherein the application server includes a User Agent module which translates queries received from the messenger system means from a messenger system protocol to the protocol utilized by the application server and translates replies generated by the application server from the application server protocol to the messenger system means protocol.

7. The secure access query system of claim 6 wherein the User Agent initiates the secure pathway between the application server and the messenger system means across the network firewall.

8. The secure access query system of claim 7 wherein the User Agent maintains the secure pathway open as a warm socket which provides for full duplex communication between the application server and the messenger system means until the secure pathway is terminated by the application server.

9. The secure access query system of claim 1 wherein the application server maintains the secure pathway between the application server and the messenger system means as a warm socket whether or not queries or replies are being transmitted along the secure pathway.

10. The secure access query system of claim 1 wherein the network firewall prevents any access through the firewall to the application server initiated from outside of the network firewall.

11. The secure access query system of claim 1 wherein the messenger system means transmits queries to the application server which are responded to only if they are of a type authorized by the application server.

12. The secure access query system of claim 1 wherein there are a plurality of communication servers coupled to the messenger system means.

13. The secure access query system of claim 1 wherein there are at least 2 application servers coupled to the messenger system means, each application server being connected to the messenger system means along a secure pathway established by each application server between the messenger system means and the application server.

14. The secure access query system of claim 13 wherein each of the application servers restricts its secure pathway with the messenger system means to a specified port of the messenger system means.

15. The secure access query system of claim 13 wherein the messenger system means establishes a subscription list identifying each of the application servers with a secure pathway to the messenger system means.

16. A middleware control system for a secure access query system including a communication server and an application server, comprising:
   a gateway module, coupled to the communication server, for converting the communication server protocol to a messenger system protocol for queries received from a user and for converting replies from the application server from the messenger system protocol to the communication server protocol for transmission to the user;
   a network firewall for preventing unauthorized access to the application server and for preventing any connections established from outside of the firewall;
   a user agent module, coupled to an application server, for establishing a secure connection and for converting the messenger system protocol to the application server protocol for receiving queries from the communication server and converting the application server protocol to the messenger system protocol for providing replies to queries;
   messenger system means, coupled to the gateway module of the communication server and the user agent module, for receiving queries from the communication server in a messenger system protocol, for transmitting the query across the network firewall along a secure pathway established by the user agent module of the application server between the messenger system means and the user agent module, for receiving replies to the queries from the application server along the secure pathway and transmitting the replies to the communications server;
   whereby queries from the user outside of the network firewall are communicated in a secure fashion to the application server within the firewall and replies are provided to the user from the application server through the secure pathway with the messenger system means.

17. A secure access query system, comprising:
   an application server for establishing a secure pathway and for providing replies to queries;
   a network firewall for preventing unauthorized access to the application server;
   messenger system means, for receiving queries from a user, transmitting the query across the network firewall along a secure pathway established by the application server between the messenger system means and the application server, receiving replies to the query from the application server along the secure pathway and transmitting the replies to the user;

whereby queries from the user outside of the network firewall are communicated in a secure fashion to the application server within the firewall and replies are provided to the user from the application server through the secure pathway with the messenger system means.

18. A secure access query system, comprising:

at least two application servers for establishing secure pathways and for providing replies to queries;

a network firewall for preventing unauthorized access to the application servers;

messenger system means, for receiving queries from a user, transmitting the query across the network firewall along secure pathways established by the application servers between the messenger system means and the application servers, receiving replies to the queries from the application server along the secure pathway and transmitting the replies to the user, and for dynamically load balancing the queries received from the user to the at least two application servers by selecting which of the application servers receives a query;

whereby queries from the user outside of the network firewall are communicated in a secure fashion to the application server within the firewall and replies are provided to the user from the application server through the secure pathway with the messenger system means and the load of queries between the application servers is dynamically balanced.

19. A secure access query system, comprising:

a communication server for receiving queries from a user and transmitting replies to the user;

at least two application servers for establishing secure pathways and for providing replies to queries;

a network firewall for preventing unauthorized access to the application servers;

messenger system means, coupled to the communication server and the application servers, for transmitting the queries across the network firewall along secure pathways established by the application servers between the messenger system means and the application servers, receiving replies to the queries from the application server along the secure pathway and transmitting the replies to the communication server, and for dynamically load balancing the queries received from the user to the at least two application servers by selecting which of the application servers receives a query;

whereby queries from the user outside of the network firewall are communicated in a secure fashion to the application server within the firewall and replies are provided to the user from the application server through the secure pathway with the messenger system means and the load of queries between the application servers is dynamically balanced.

20. A middleware system, comprising:

access means for obtaining access to and querying at least one application component;

at least one application component for responding to queries;

a user agent module, coupled to each of the at least one application components for establishing a connection;

messenger system means, coupled to the access means and to the each user agent module for directing queries from the access means to the user agent module of an appropriate application component in a transfer protocol and for directing replies to the queries from the user agent module of the appropriate application component to the access means in the transfer protocol;

the access means converting the queries into the transfer protocol for transmission to the messenger system means in the transfer protocol and converting the replies received from the messenger system means from the transfer protocol to an access means protocol;

the user agent module converts the queries from the transfer protocol to the application component protocol and converts the replies from the application component from the application component protocol to the transfer component and establishes the connection to the messenger system means;

whereby queries between access means and application components can be implemented without regard to the programming language, operating system or protocol used by either the access means or the application components.

21. An access control system, comprising:

a firewall for preventing unauthorized access from outside the firewall;

a resource, incorporating information and/or logic, inside the firewall and for establishing a secure pathway;

a middleware system, outside the firewall, coupled to the resource on a secured pathway established by the resource, and enabled to communicate with the resource along the secured pathway, and obtain authorized access to the resource's information and/or logic, wherein the firewall blocks any connection from outside the firewall;

whereby the resource is protected against any access from outside the firewall except through the middleware system.

22. The access control system of claim 21 wherein the resource includes a database server.

23. The access control system of claim 22 wherein the resource includes an application server.

24. The access control system of claim 21 wherein the middleware system communicates with other resources outside of the firewall.

25. The access control system of claim 24 wherein the resources outside of the firewall include a web server.

26. The access control system of claim 24 wherein the middleware system acts as a communications server which communicates with other servers seeking access to the resource's information.

27. The access control system of claim 21 wherein the resource includes at least two application servers, each of which has its own secured pathway to the middleware system across the firewall.

28. The access control system of claim 27 wherein the middleware system balances the requests for access between the application servers.

29. The access control system of claim 21 wherein the information includes data in a database.

30. The access control system of claim 21 wherein the logic includes program code which is executed by the resource.

* * * * *